United States Patent [19]

Bianchi

[11] 4,038,787

[45] Aug. 2, 1977

[54] ABRASIVE GLOVE

[75] Inventor: Albert A. Bianchi, Mount Prospect, Ill.

[73] Assignee: RB Products Corporation, Skokie, Ill.

[21] Appl. No.: 662,734

[22] Filed: Mar. 1, 1976

[51] Int. Cl.² ............................................. B24D 11/00
[52] U.S. Cl. ............................................. 51/391; 2/161 R
[58] Field of Search ............... 51/358, 391, 392, 394, 51/395, 397, 398, 405, 407; 2/161

[56] References Cited

U.S. PATENT DOCUMENTS

| 168,836 | 10/1875 | Hall | 2/161 R |
|---|---|---|---|
| 203,959 | 5/1878 | Townsend | 2/161 R |
| 436,206 | 9/1890 | Bertheau | 2/161 R |
| 1,346,683 | 7/1920 | Reynolds | 2/161 X |
| 2,459,985 | 1/1949 | Woodbury | 2/161 R |
| 3,151,333 | 10/1964 | Scholz | 51/391 X |
| 3,643,386 | 2/1972 | Grzyll | 2/161 R X |
| 3,748,792 | 7/1973 | Lamb | 51/391 |
| Re. 22,167 | 8/1942 | Wells | 2/161 R |

FOREIGN PATENT DOCUMENTS

| 186,218 | 11/1936 | Switzerland | 51/407 |

*Primary Examiner*—Al Lawrence Smith
*Assistant Examiner*—Nicholas P. Godici
*Attorney, Agent, or Firm*—Vogel, Dithmar, Stotland, Stratman & Levy

[57] ABSTRACT

A glove having a flexible body with a plurality of discrete abrading units disposed on the glove to permit free flexing of the finger stalls, the thumb and palm. The abrading units comprise a plurality of hard and sharp particles such as silicon carbide dispersed in an adhesive. The abrading units are fixedly connected to the glove surface by a waterproof adhesive.

18 Claims, 5 Drawing Figures

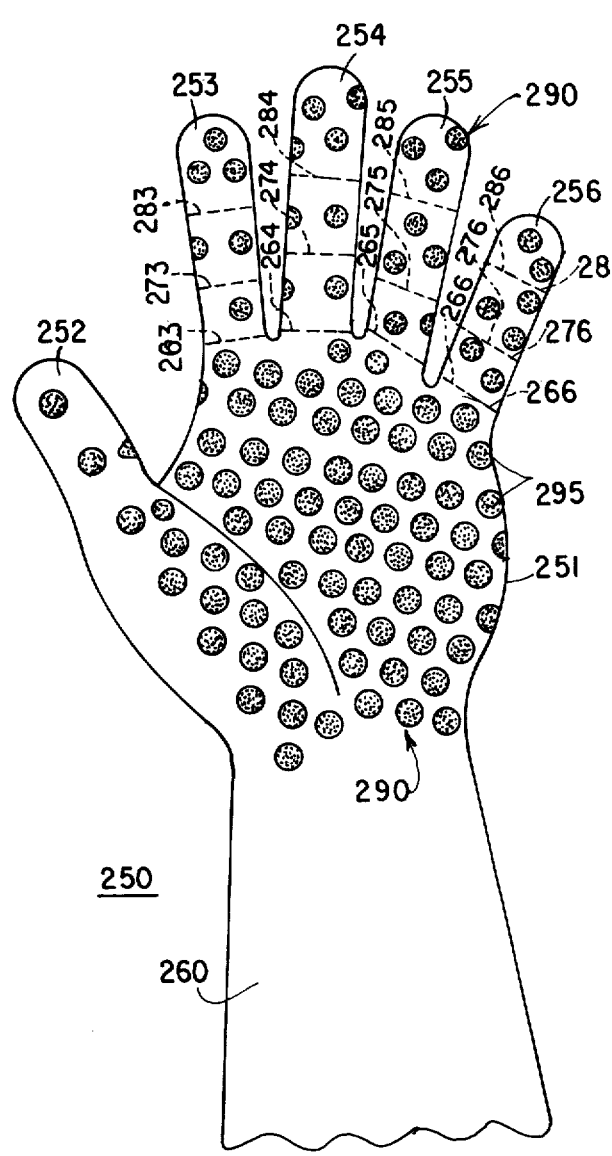
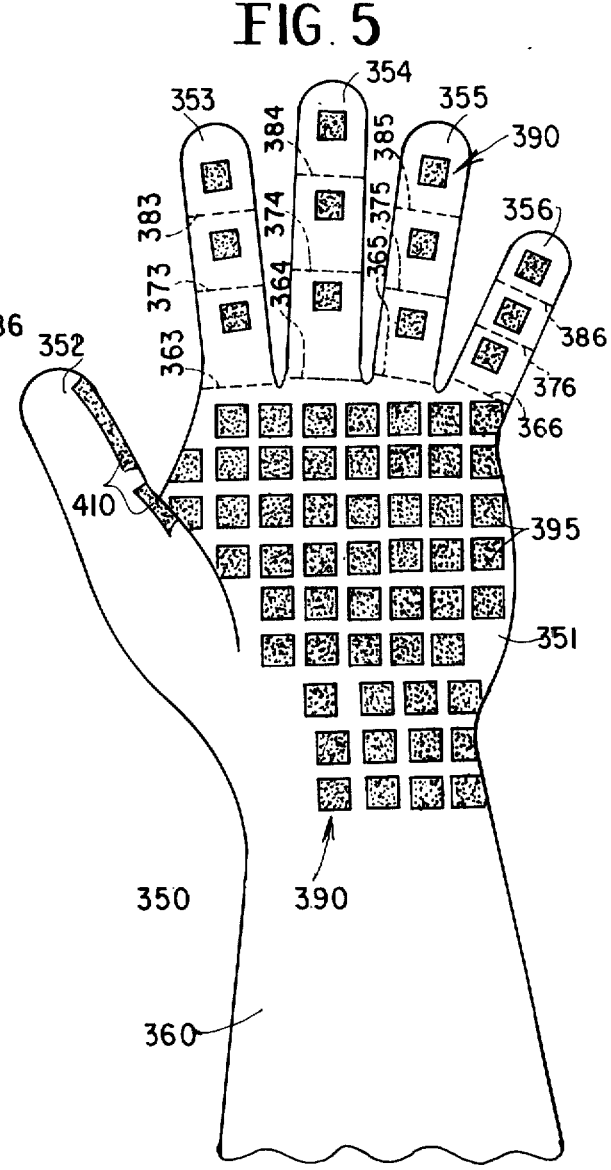

ABRASIVE GLOVE

BACKGROUND OF THE INVENTION

Gloves having abrasive material thereon are not in and of themselves new, but each glove which has appeared on the market, for one reason or the other, has not been satisfactory for both use by the housewife to peel potatoes, carrots and the like, and for heavier duty uses such as abrading paint, scouring pans and the like, while permitting complete flexibility of the glove. Representative of the prior art devices is the glove disclosed in U.S. Pat. No. 2,459,985 issued Jan. 25, 1949 to C. H. Woodbury for HAND COVERING. The Woodbury device shows a glove in which the entire finger, palm and substantially the entire thumb portion of the glove is covered by an abrasive material which while effective to abrade certain objects results in a very stiff unwieldy, non-flexible glove and is unsatisfactory for handling smaller items such as carrots, potatoes and the like.

U.S. Pat. No. 3,050,738 issued Aug. 28, 1962 to A. W. Rytina for GLOVE, discloses a glove in which the glove fabric is fabricated from a mixture of plastisol and elastomer flock dispersed therein. The flock disclosed in the Rytina patent is insufficiently hard and sharp for use in heavy duty jobs such as scouring pots, pans and abrading paint. The Rytina glove like the Woodbury glove is clumsy and relatively inflexible. U.S. Pat. No. 3,643,386 issued Feb. 22, 1972 to Grzyll for ABRASIVE HAND APPAREL, discloses a glove in which insufficient areas are covered with an abrasive material which is insufficiently hard and sharp to accommodate all of the jobs necessary in the device of the present invention. The Grzyll patent also discloses a mitten having the abrasive material over substantially the entire working surface, resulting in a cumbersome, non-flexible device much like the Rytina and Woodbury gloves.

In order to obviate all of the short comings of the prior art and to provide a glove which is flexible, thereby allowing the user to handle small items such as potatoes, carrots and other small vegetables, while at the same time being capable of the most heavy duty abrading uses, a glove has been constructed in which individual discrete abrading units are provided and spaced to enable the entire glove including thumb, palm and finger stall portions to be flexible.

SUMMARY OF THE INVENTION

It is a general object of the present invention to provide a glove for abrading large and small objects in which individual discrete abrading units are positioned to provide adequate abrading areas while at the same time maintaining flexibility of the fingers, the thumb and the palm of the glove.

A general object of the present invention is to provide a glove having a flexible body with a palm, a thumb and finger stalls, each of said finger stalls in use covering three finger joint lines, a plurality of discrete abrading units on said plam, said thumb and each of said finger stalls disposed to permit free flexing of said finger stalls at the joint lines and to permit free flexing of said thumb and palm, and each of said abrading units including a plurality of hard and sharp particles fixedly adhered to said glove, whereby said glove maybe used as to abrade potatoes to peel same producing easily disposable pulp, or to abrade paint and the like while permitting free flexing of the thumb, finger and palm.

Another object of the present invention is to provide a glove of the type set forth in which each of the abrading units include a plurality of hard and sharp particles dispersed in a layer of adhesive and securing means are provided for securing the layer of adhesive having the hard and sharp particles dispersed therein to the surface of the glove.

A further object of the present invention is to provide a glove of the type set forth wherein the abrading units are circular in shape.

A still further object of the present invention is to provide a glove of the type set forth in which circular abrading units are provided on the finger stalls and generally rectangular abrading units are applied on the palm portion.

These and other objects of the present invention may be more readily understood by reference to the following drawings and specification in which:

BRIEF SUMMARY OF THE DRAWINGS

FIG. 4 is a view of another embodiment of the present invention; and

FIG. 5 is a view of still another embodiment of the present invention.

DETAILED DESCRIPTION OF THE PREFERRED EMBODIMENT

Figure 1:
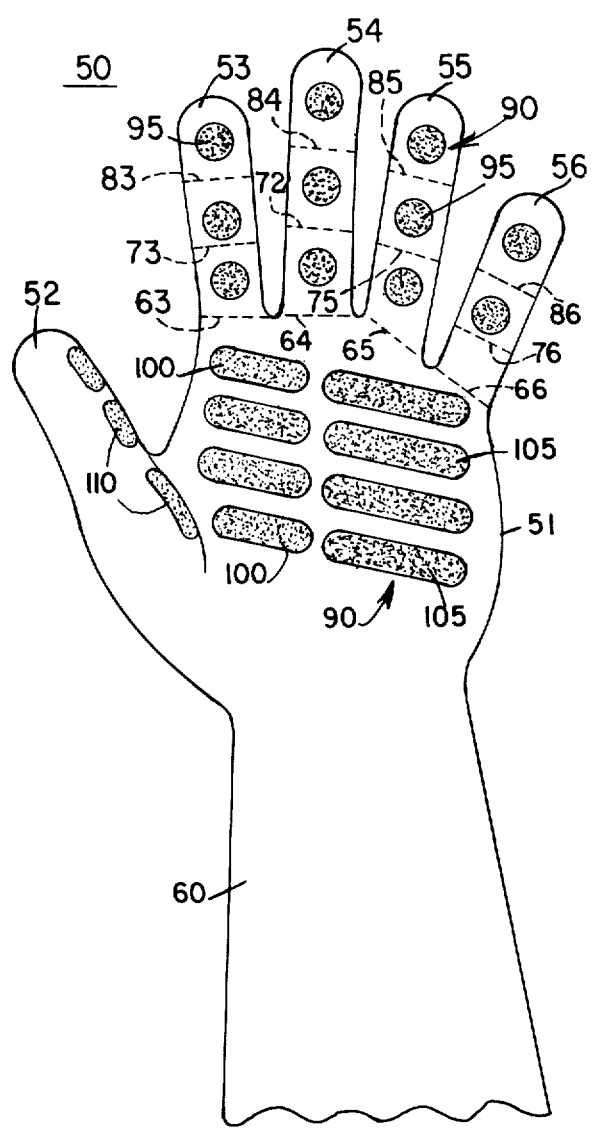
FIG. 1 is a view of the first embodiment of the invention showing the positions of the abrading units on the glove surface.

Referring now to the drawings, there is disclosed in FIG. 1 a glove 50 having a plam portion 51, a thumb portion 52 and finger stalls 53, 54, 55 and 56. An elongated cuff portion 60 extends away from the palm portion 51 in a direction substantially opposite to the finger stalls 53-56. The length of the cuff portion 60 is sufficient to enable it to be turned back to form a cuff while in use thereby preventing water from running down the arm of the user. The dotted lines 63, 64, 65 and 66, at the junctures between the finger stalls 53-56 and the palm portion 51 represent the position of the joint lines between fingers and palm of a user's hand inserted in the glove. Similarly, the dotted lines 73-76 represent the first joint lines on each finger and likewise the dotted lines 83-86 represent the second joint lines of each finger. The joint lines 63-66, 73-76 and 83-86 are illustrated to show the critical positioning of the adrading units 90 on the glove 50, as hereinafter set forth.

The glove 50 is provided with a plurality of abrading units 90 with each abrading unit being critically positioned to provide maximum flexibility of the entire glove 50. As seen, the abrading units 90 include circular units 95 on each of the finger stalls 53-56 and generally short rectangular abrading units 100 on the palm 51 and longer rectangular abrading units 105 also on the palm 51. The thumb 52 is provided with a plurality of short, substantially rectangular units 110. Each of the circular abrading units 95 is positioned on its respective finger stalls 53-56 intermediate the joint lines to permit maximum flexibility of the glove 50 at each and every joint line. Specifically, there is provided a circular abrading unit 95 between the joint lines 63 and 73, between the joint lines 73 and 83 and between the joint line 83 and the distal end of the finger stall 53. A similar construction is provided for each of the finger stalls 54, 55 and 56.

With respect to the abrading units 100 and 105 on the palm 51, each of those abrading units is spaced at least ⅛ inch from the next like numbered abrading unit, and in the embodiment illustrated in FIG. 1, each abrading unit 100 is spaced at least ⅛ inch from the next adjacent abrading unit 105. The space intermediate adjacent abrading units 100 and 105 is preferred, but not critical; however, the space between adjacent abrading units of like numbers is critical to provide the required flexibility to handle small objects.

The glove 50 may be made of latex or any synthetic rubber-like material which is water proof. Preferably the glove 50 is contoured to fit the hand in a skin tight manner, tapered at the wrist portion 60 and long enough to be cuffed to prevent water from running down the arm. As is well known in the field, the inside of the glove 50 may be flock lined to facilitate entry and exit of the hand into the glove.

The abrading units 90 comprise a plurality of sharp and hard particles such as silicon carbide, fused aluminum oxide, carborundum, emory, garnet or the like. The preferred grit size is in the range of from about No. 34 to about No. 40, whereby a rather large particle is employed. It is understood that somewhat finer grit particles may be used without departing from the true spirit and scope of this invention. In general, the abrasive units 90 are fixedly adhered to the glove by means of any suitable water proof adhesive.

Figure 2:
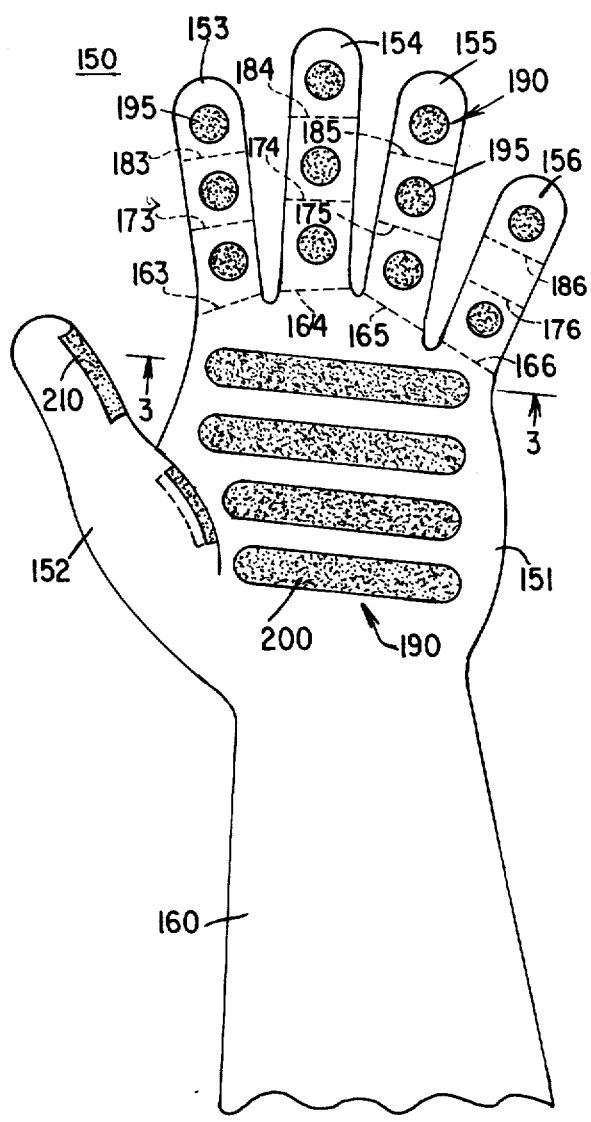
FIG. 2 is a view showing a second embodiment of the invention.

Referring now to FIG. 2, there is disclosed a second embodiment of the invention in the form of a glove 150 having a palm portion 151, a thumb portion 152 and finger stalls 153–156. An elongated cuff portion 160 extends away from the palm portion 151 in a direction substantially opposite to the finger stalls 153–156. The length of the cuff portion 160 is sufficient to enable it to be turned back to form a cuff in use, thereby preventing water from running down the arm of the user. The dotted lines 163–166 at the junctures between the finger stalls 153–156 and the palm portion 151 represent the position of the joint lines between the fingers and palm of a hand inserted in the glove. Similarly, the dotted lines 173–176 represent the first joint lines on each finger and likewise the dotted lines 183–186 represent the second joint lines of each finger. The joint lines 163–166, 173–176 and 183–186 are illustrated to show the critical positioning of the abrading units 190 on the glove 150, as hereinafter set forth.

The glove 150 is provided with a plurality of abrading units 190 with each abrading unit being critically positioned to provide maximum flexibility of the entire glove 150. As seen, the abrading units 190 include circular units 195 on each of the finger stalls 153–156 and generally rectangular abrading units 200 on the palm 151. The thumb 152 is provided with a plurality of rectangular units 210. Each of the circular abrading units 195 is positioned on its respective finger stall 153–156 intermediate the joint lines to permit maximum flexibility of the glove 150 at each and every joint line. Specifically, there is provided circular abrading units 195 between the joint lines 163 and 173, between the joint lines 173 and 183, and between the joint line 183 and the distal end of the finger stall 153. A similar construction is provided for each of the finger stalls 154, 155 and 156.

With respect to the abrading units 200 on the palm 151, each of those abrading units are spaced at least ⅛ inch from the next line numbered abrading unit, thereby to provide flexibility of the palm 151, the thumb 152 and each of the finger stalls 153–156.

Figure 3:
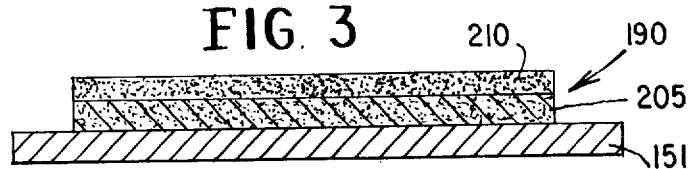
FIG. 3 is a view in cross section of an abrading unit illustrated in FIG. 2 as seen along line 3-3 thereof.

Turning now to FIG. 3, there is shown a representative abrading unit 190 in which the glove palm 151 provides a base or support for a securing agent 205 which may be any water proof adhesive. The securing agent 205 fixedly connects the glove surface 151 to the upper layer 210 which is a dispersion of the above-described grit particles in a suitable adhesive material similar to the securing agent. It is clear, that each abrading unit 190 formed of a mixture 210 of water proof adhesive and sharp and hard particles may be cut into any shape desired and thereafter precisely positioned on the surface of the glove 150. The information of the abrading units 190 in the manner described facilitates the manufacture of the glove 150 and also enables exact spacing of each abrading unit on the glove surface. Further, the use of a layer of water proof adhesive as a securing agent 205 intermediate the layer 210 of abrasive particles and water proof adhesive provides a longer lasting glove 150, since the abrasive particles are well separated from the glove surface and are prevented from working into and ripping the glove surface during the use of the glove. This is a critical feature of the present invention since it permits much coarser, harder and sharper particles to be used in the abrading layer 210 than otherwise would be possible. The construction described in FIG. 3 in combination with the specific geometry discussed above, provides the unexpected success of the construction illustrated.

Referring now to FIG. 4 there is disclosed another embodiment 250 of the present invention in which the glove 250 has a palm portion 151, a thumb portion 252 and finger stalls 253–256. An elongated cuff portion 260 extends away from the palm portion 251 in a direction substantially opposite to the finger stalls 253–256. The length of the cuff portion 260 is as previously described. The dotted lines 263–266 at the junctures between the finger stalls 253–256 and the palm portion 251 represent the position of the joint lines between fingers and palm of a user's hand inserted in the glove. Similarly, the dotted lines 273–176 represent the first joint lines on each finger and likewise the dotted lines 283–286 represent the second joint lines of each finger. The joint lines 263–266, 273–276, and 283–286 are illustrated to show the critical positioning of the abrading units 290 on the glove 250, as hereinafter set forth.

The glove 250 is provided with a plurality of abrading units 290 with each abrading unit being critically positioned to provide maximum flexibility of the entire glove 250. As seen, the abrading units 290 include circular units 295 on each of the finger stalls 253–256, thumb 252 and the palm portion 251. Each of the abrading units 295 is critically positioned to permit each of the finger stalls 253–256 to be bent along the first and second joint lines as hereinbefore described and each of the abrading units 295 on the palm 251 is at least ⅛ inch separated from the next adjacent abrading unit, whereby to provide sufficient flexibility for the palm 251 of the glove 250. Similarly, the thumb 252 also has its flexibility preserved.

Referring now to FIG. 5 of the drawings, there is disclosed yet another embodiment 350 of the present invention in which the glove 350 has a plam portion 351, a thumb portion 352 and finger stalls 353–356. An elongated cuff 360 is provided in the same manner as previously described. The dotted lines 363–366 at the junctures between the finger stalls 353-356 and the palm portion 351 represent the position of the joint lines between finger and palm of a user's hand inserted in the glove. Similarly, the dotted lines 373-376 represent the first joint line on each finger and likewise the dotted lines 353-356 represent the second joint lines of each finger. The joint lines 363-376 and 383-386 are illustrated to show the critical positioning of the abrading units 390 on the glove 350, as hereinafter set forth.

The glove 350 is provided with a plurality of abrading units 390 with each abrading unit being critically positioned to provide maximum flexibility of the entire glove 350. As seen, the abrading units 390 include generally square units 395 on each of the finger stalls 353-356 and the palm 351. If desired, the abrading units 395 may extend downwardly from the palm 351 toward the cuff portion 360. Each of the abrading units 395 is positioned on a respective finger stall 353-356 intermediate the joint lines to permit maximum flexibility of the glove 350 at each and every joint line. Specifically, there is provided a square abrading unit 395 between the joint lines 363 and 373, between the joint lines 373 and 383 and between the joint line 383 and the distal end of the finger stall 353. A similar construction is provided for each of the finger stalls 354-356.

With respect to the abrading units 395 on the palm 351, they are each positioned at least ⅛ inch from each next adjacent abrading unit, thereby to provide maximum flexibility of the palm portion 351. The thumb 352 is provided with elongated abrading units 410 which are spaced apart a sufficient distance, at least ⅛ inch to provide the necessary flexibility of the thumb 352.

It is clear from the foregoing, that various shaped abrading units may be mixed and matched without departing from the true spirit and scope of the invention. The circular abrading units may be combined with the square abrading units and with the rectangular abrading units to provide a glove having the same abrading qualities, durability and flexibility hereinbefore described. So long as the proper positioning of the abrading units is observed to retain glove flexibility, and sufficient glove area is covered to enable heavy duty work, such as paint abrading, to be performed, the inventive concept has been utilized. The coarse grit particles as well as the particular construction of the abrading units result in a durable more useful product than heretofore available.

While there has been described what at the present is considered to be the preferred embodiments of the present invention, it will be appreciated that various modifications and alternations may be made herein without departing from the true spirit and scope of the present invention, and it is intended to cover in the appended claims all such modifications and alterations.

What is claimed is:

1. A glove having a flexible body with a palm, a thumb and finger stalls, each of said finger stalls in use covering three finger joints lines, a plurality of discrete abrading units on said palm, said thumb and each of said finger stalls disposed to permit free flexing of said finger stalls at the joint lines and to permit free flexing of said thumb and palm, each of said abrading units consisting of a plurality of hard and sharp particles dispersed in a layer of adhesive, and securing means free of hard and sharp particles intermediate said glove and said abrading units for securing each of said abrading units to said glove and for insulating said glove therefrom, whereby said glove may be used to abrade potatoes to peel same producing easily disposable pulp, or to abrade paint and the like while permitting free flexing of the thumb, finger and palm, without the hard and sharp particles in said abrading units tearing said glove.

2. The glove defined in claim 1, wherein said glove material is rubber-like, water proof and includes an elongated cuff portion capable of being turned back in use to prevent water draining down the arm of a user.

3. The glove defined in claim 1, wherein said finger stall has a plurality of discrete abrading units thereon.

4. The glove defined in claim 1, wherein the thumb has a plurality of abrading units thereon.

5. the glove defined in claim 1, wherein the palm has a plurality of abrading units thereon.

6. The glove defined in claim 1, wherein the palm has a plurality of abrading units thereon each spaced apart at least ⅛' from the next abrading unit.

7. The glove defined in claim 1, wherein the hard and sharp particles are silicon carbide having a grit size in the range of between about Nos. 34 and about 40.

8. The glove defined in claim 1, wherein the hard and sharp particles are aluminum oxide having a grit size in the range of between about Nos. 34 and about 40.

9. The glove defined in claim 1, wherein the hard and sharp particles are garnet having a grit size in the range of between about Nos. 34 and about 40.

10. The glove defined in claim 1, wherein the hard and sharp particles are emery having a grit size in the range of between about Nos. 34 and about 40.

11. The glove defined in claim 1, wherein the hard and sharp particles are carborundum having a grit size in the range of between about Nos. 34 and about 40.

12. The glove defined in claim 1, wherein at least some of the abrading units are circular in shape.

13. The glove defined in claim 1, wherein at least some of the abrading units are bar-shaped and generally rectangular.

14. The glove defined in claim 1, wherein at least some of the abrading units are square in shape.

15. The glove defined in claim 1, wherein said adhesive is water proof.

16. The glove defined in claim 1, wherein said adhesive and said securing means are water proof and substantially the same material.

17. The glove defined in claim 1, wherein the abrading units are not more than about 1/8' thick.

18. The glove defined in claim 1, wherein the abrading units on the finger stalls are circular in shape and the abrading units on the palm are generally rectangular in shape.

* * * * *